(12) United States Patent
Wise

(10) Patent No.: US 9,100,089 B1
(45) Date of Patent: Aug. 4, 2015

(54) ROAMING CONTENT CACHE UPDATE AND REPORTING SYSTEM

(71) Applicant: MTN Satellite Communications, Seattle, WA (US)

(72) Inventor: Robert M Wise, Issaquah, WA (US)

(73) Assignee: MTN Satellite Communications, Inc., Seattle, WA (US)

(*) Notice: Subject to any disclaimer, the term of this patent is extended or adjusted under 35 U.S.C. 154(b) by 174 days.

(21) Appl. No.: 13/962,851

(22) Filed: Aug. 8, 2013

Related U.S. Application Data

(60) Provisional application No. 61/680,844, filed on Aug. 8, 2012.

(51) Int. Cl.
 *H04B 7/185* (2006.01)
(52) U.S. Cl.
 CPC .................................. *H04B 7/18513* (2013.01)

(58) Field of Classification Search
 None
 See application file for complete search history.

(56) References Cited

U.S. PATENT DOCUMENTS

| 5,825,814 | A  | * | 10/1998 | Detwiler et al. | ............. | 375/219  |
|-----------|----|---|---------|-----------------|---------------|----------|
| 8,768,244 | B2 | * | 7/2014  | Taylor          | ........... | 455/12.1 |
| 2011/0277001 | A1 | * | 11/2011 | Kaluskar et al. | .............. | 725/80 |
| 2013/0137365 | A1 | * | 5/2013  | Taylor          | .......... | 455/12.1 |
| 2014/0136730 | A1 | * | 5/2014  | Wahler          | ......... | 709/242 |

\* cited by examiner

*Primary Examiner* — Fayyaz Alam
(74) *Attorney, Agent, or Firm* — FSP LLC

(57) ABSTRACT

A content caching process involves a first moving vessel (MCP) communicating a content request to a satellite. A central bandwidth manager (CBM) receives the content request from the satellite and selects one or both of a port and a second MCP to cache the content specified in the request. The first MCP downloads the content from the second MCP or port using a directed wireless link, upon obtaining proximity with the port or second MCP.

8 Claims, 5 Drawing Sheets

ROAMING CONTENT CACHE UPDATE AND REPORTING SYSTEM

PRIORITY

This application claims priority under 35 U.S.C. 119 to U.S. 61/680,844, filed on Aug. 8, 2012, which is incorporated herein by reference in its entirety.

BACKGROUND

Satellites provide a mechanism for transmitting data from terrestrial locations to other terrestrial locations. Satellites are useful when transmit distances are long, so that 'line of sight' transmission is impractical, and when the use of wireline data transmission is unavailable. Satellite data transmission is wireless and consequently subject to interference from terrestrial weather and electromagnetic emission. Bandwidth for satellite transmission is also expensive relative to other forms of data communication.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
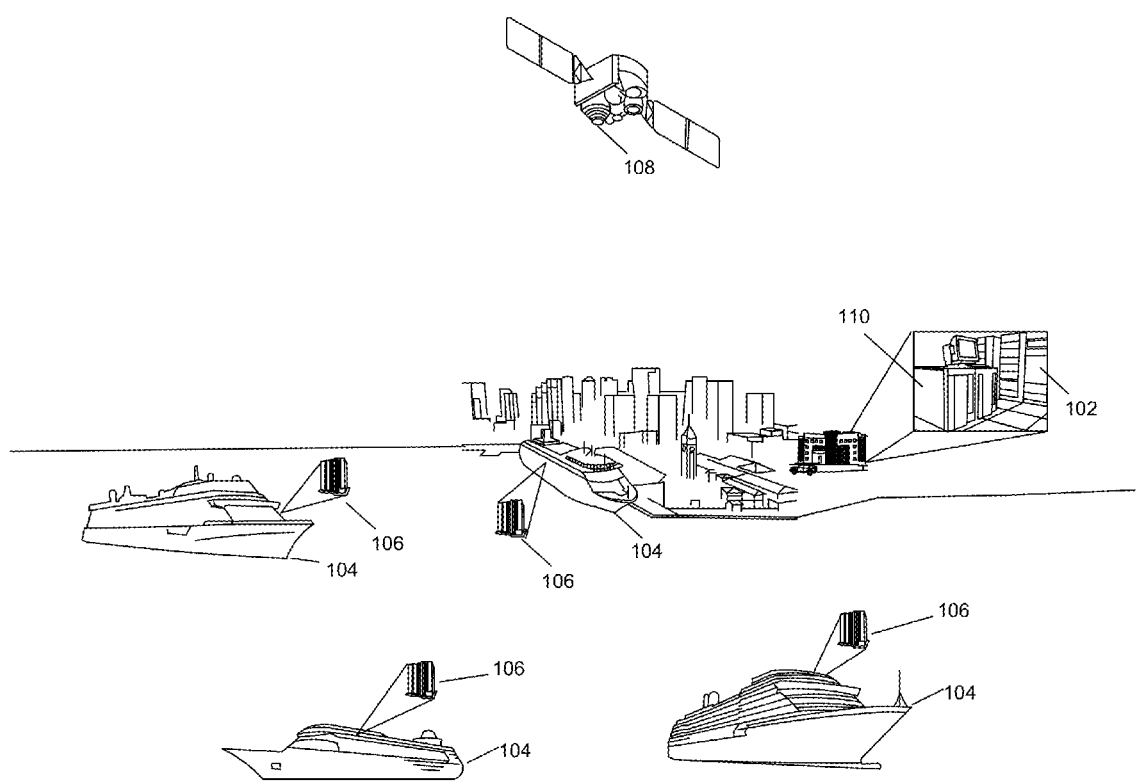
FIG. 1 illustrates an example communication environment including multiple mobile communication platforms communicating via a shared satellite bandwidth pool.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Definitions

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

CIR: Committed Information Rate—the guaranteed minimum amount of bandwidth committed to a customer, application or remote site MIR: Maximum Information Rate—the maximum amount of bandwidth allocated to a customer, application or remote site based on availability and not guaranteed Bandwidth Pool: A specific segment of bandwidth that is typically shared between multiple customers, sites or ships in a region.

VSAT: Very Small Aperture Terminal

Wireless: includes WIFI, LTE, WIMAX, 3G, 4G and any other wireless communications technologies.

CBM: Central Bandwidth Manager—located in a central data center

LSS: Local Service Selector—located on individual vessels, remote sites or vehicles NMS: Network Management System MCP: Mobile Communications Platform (includes ships, vehicles and aircraft)

Shore side: Refers to any fixed (non-mobile) location in the area of an MCP.

Backhaul (back-haul): bandwidth available between a shore-side antenna and backbone networks of the Internet.

Spatial diversity: A measure of overlap between antennae pairings between antennae of an MCP and shore-side antennae. Fewer overlaps equates to higher spatial diversity. Spatial diversity may also include a measure of spatial separation between shore-side antennae or the communication channels of shore-side and MCP paired antennae.

Shore-side antenna: An antenna that is not on a moving vessel; a fixed-location antenna.

Application: Logic that executes as one or more processes of a device operating system.

Real-time: Events or actions that take place in close temporal proximity to their cause or stimulus.

Predictive coupling: An antenna pairing decision made prior to actual communication contact between the antennas.

Port: In the context of an MCP location, refers to a location where an MCP can dock/park and where passengers can typically disembark.

Bandwidth allocation: Reservation of bandwidth resources on a communication channel.

WiFi (Wi-Fi): Wi-Fi is the name of a popular wireless networking technology that uses radio waves to provide wireless high-speed Internet and network connections. A common misconception is that the term Wi-Fi is short for "wireless fidelity," however this is not the case. Wi-Fi is simply a trademarked term meaning IEEE 802.11x. The Wi-Fi Alliance, the organization that owns the Wi-Fi (registered trademark) term specifically defines Wi-Fi as any "wireless local area network (WLAN) products that are based on the Institute of Electrical and Electronics Engineers' (IEEE) 802.11 standards." Initially, Wi-Fi was used in place of only the 2.4 GHz 802.11b standard, however the Wi-Fi Alliance has expanded the generic use of the Wi-Fi term to include any type of network or WLAN product based on any of the 802.11 standards, including 802.11b, 802.11a, dual-band, and so on, in an attempt to stop confusion about wireless LAN interoperability.

Description

A content aggregator is a computer system with a large volume of mass storage. The selection of content to aggregate is based on human activity on the MCP while the MCP is limited to a low bandwidth connection. For example requests for music, video, or large files may be made using URLs and so forth from mobile devices or computer systems on a cruise ship while it is at sea, limited to a low-bandwidth satellite connection to the Internet.

Rather than attempting to fulfill these requests back to the MCP immediately, the requests may instead be cached on the LSS of the MCP. When a first MCP comes within a range of a directed hi-bandwidth beam provided from a "port", e.g. a fixed bandwidth service and/or content aggregator location (e.g., a shaped WiFi beam from a ship dock), or within beam range of a second MCP, the requested content (that which is not already cached by the LSS of the first MCP) may be directed from the port or LSS of the second MCP to the LSS of the first MCP.

In one embodiment, when content is requested that isn't cached by the LSS, the LSS communicates with the CBM to determine one or more ports or other MCPs that cache or will cache the content. The CBM applies route, timing, and other factors to determine a time interval when the requested content will be available in a port content aggregator or the LSS of a second MCP that will be within range of a directed hi-bandwidth link of the first MCP, and reports this time interval to the requesting device. Optionally, the LSS may also provide the requesting device with an option to obtain the content sooner, for example by prioritizing the content request on the satellite connection, for a payment.

The LSS comprises logic to track and capture content (e.g., webpage) requests from devices on the MCP, and to then download the content to the LSS at an appropriate time via a directed high-bandwidth link, and to communicate it to the requesting devices at a time when the link to the first MCP to a port or second MCP has sufficient bandwidth. The aggregated content may be loaded onto the LSS and stored there once the high speed link is established. The content is then available to other MCPs which may pass within a range of a directed high speed wireless data link of the first MCP. This creates a roaming distributed content aggregator, in which content requests from devices on multiple MCPs may be aggregated at ports, and an MCP approaching or leaving the port becoming a node of the distributed aggregator from which other MCPs can pull content using a directed wireless beam. Thus, the coordinates, headings, speeds, ranges, and other information about each MCP in a content aggregation zone may be applied to establish a roaming distributed content aggregation system, so that requests from a first MCP which is far from any port may be directed to a content aggregator at port, and content placed on a second MCP that is approaching, at, or leaving the port so that the content is physically carried to within a range of the first MCP and the content then transmitted between the MCPs.

In one embodiment, the time reported for availability of content not cached in an LSS may be determined according to satellite bandwidth available to the MCP comprising the LSS, and/or time until the MCP comes within directed beam range of a port or other MCP that caches the content. A person requesting the content may be advised of a time before the content is available, and provided an option to purchase priority on the low-bandwidth satellite uplink from the MCP, to get the content sooner.

In one embodiment, the time that is reported for when the content will be available depends, at least in part, on how much satellite bandwidth from a fixed bandwidth pool is allocated to the MCP. This allocation may be varied dynamically according to how many content requests are pending, and/or the estimated time to obtain the requested content, and/or whether or how many priority bandwidth purchases are submitted for the MCP.

Uplink Sharing, Channel Bonding, and Dynamic Re-Provisioning of Satellite Pool Bandwidth Satellite channels used by multiple MCPs may be shared between the MCPs while they are within a range of one another using a high speed directed wireless data connection. Requests for satellite bandwidth from devices on one of the MCPs may be redirected to the satellite channel of another MCP across the high speed data link. MCPs' location and their headings may be identified using the satellite data link itself rather than GPS or another technique.

Capacity utilization of each MCP satellite channel is monitored and load balancing of channel traffic of each MCP is coordinated between the MCPs. Channel bonding may take place in some circumstances where all the bandwidth needed for a particular operation is unavailable on any one channel.

If channel bonding takes place, it may be done from the satellite modem(s) of one of the plurality of proximate MCPs. Effectively, the single MCP chosen to provide the uplink for all the MCPs may be allocated all of the uplink bandwidth for the MCPs. A shared satellite pool of bandwidth may then be reconfigured to account for the single MCP providing all of the uplink bandwidth for the MCPs (refer to the following description).

A pool of satellite bandwidth is allocated among MCPs based upon the connectivity circumstances of the MCPs. The connectivity circumstances of a particular MCP may include whether it has access to an alternate connection to the network (e.g., port WiFi), its location, whether it is proximate to another MCP that provides uplink bandwidth, whether it has just arrived to port or will soon depart, predicted weather patterns, passenger count and other considerations, such as:
  Bandwidth cost
  Link performance and availability
  Link latency
  MCP itinerary or course
  Bandwidth availability
  Customer preferences
  Network load balance A pool of satellite bandwidth shared among all MCPs in a group of MCPS may be allocated according to the connectivity circumstances of one or more particular MCPs or applications and services within MCPs, and/or a statistical model derived from circumstances of multiple MCPs in the group. Other factors for determining an MCPs allocation of the satellite bandwidth pool include how many/what types (e.g., how large) content requests are pending on an MCP, how long before those content requests can be fulfilled using a directed high-bandwidth beam, and/or how many premium bandwidth purchases are submitted by people on the MCP.

MCPs may be grouped according to factors including MCP ownership, MCP type, geographic location, occupancy, bandwidth demands (which may be a function of connectivity plan purchases by the MCP's occupants), routes, connectivity circumstances, application requirements, and various other technical, environmental and commercial factors.

Referring to FIG. 1, bandwidth allocation for satellite 108 communications is managed and controlled by two independent but cooperating systems. They are:
1) Central Bandwidth Manager (CBM) 102
2) Local Service Selectors (LSS) 106 that are mobile and located on each MCP 104

The CBM 102 is responsible for the overall monitoring and control of the bandwidth allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102. Once a routing decision is made and executed, the CBM 102 instructs the relevant NMS 110 to reallocate the bandwidth across the remaining MCPs 104.

Example

Figure 2:
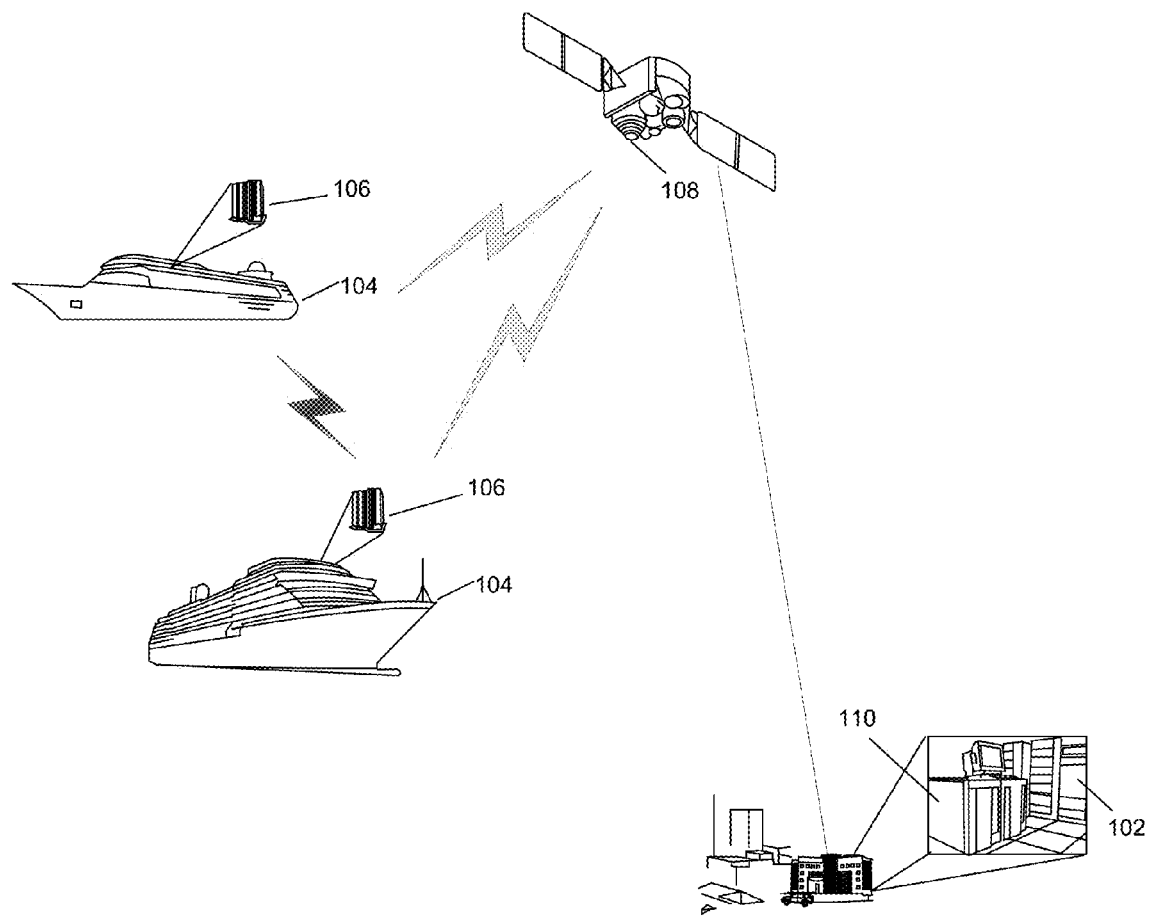
FIG. 2 illustrates an example communication environment including multiple mobile communication platforms communicating via a shared satellite uplink.

Referring to FIG. 2, each of two cruise ships belonging to a common cruise line is allocated between 1 Mb of a 10 Mbps pool of bandwidth on a specific satellite covering the Caribbean region. All of the ships are equipped with VSAT and long range WIFI antennas. Several ports along the itinerary of the vessels are equipped with WIFI base stations. Each vessel is allocated a 1 Mbps CR, burstable to a 3 Mbps MIR, within the 10 Mbps pool.

Ship B is at port, and ship A is far at sea. Devices on ship A request content that is not available on the LSS of ship A. The requests are routed via satellite to the LSS of ship B, which downloads the content from the port content aggregator. Ship B then leaves port. As ship "A" enters within WiFi range of ship B, the LSS device onboard ship A requests the missing content from the LSS of ship B. The LSS of ship B provides the content to the LSS of ship A.

Figure 3:
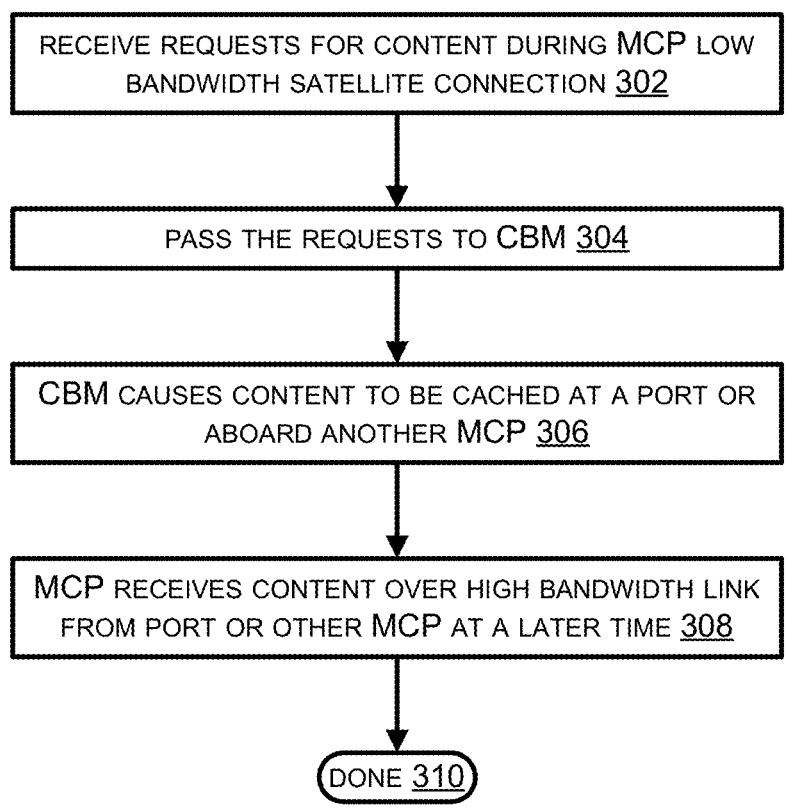
FIGS. 3-5 illustrate example processes for establishing a roaming content aggregation system.
Figure 4:
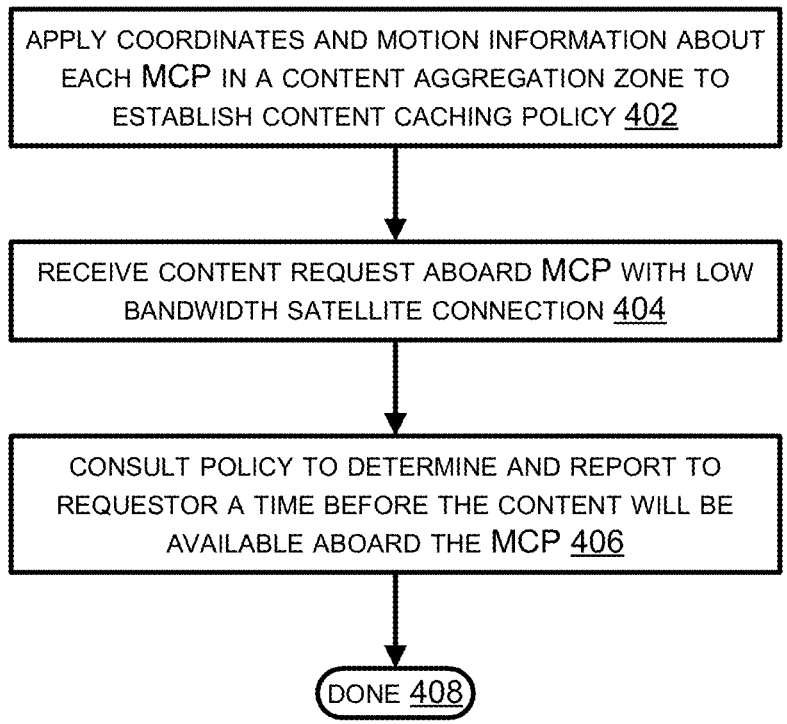
Figure 5:
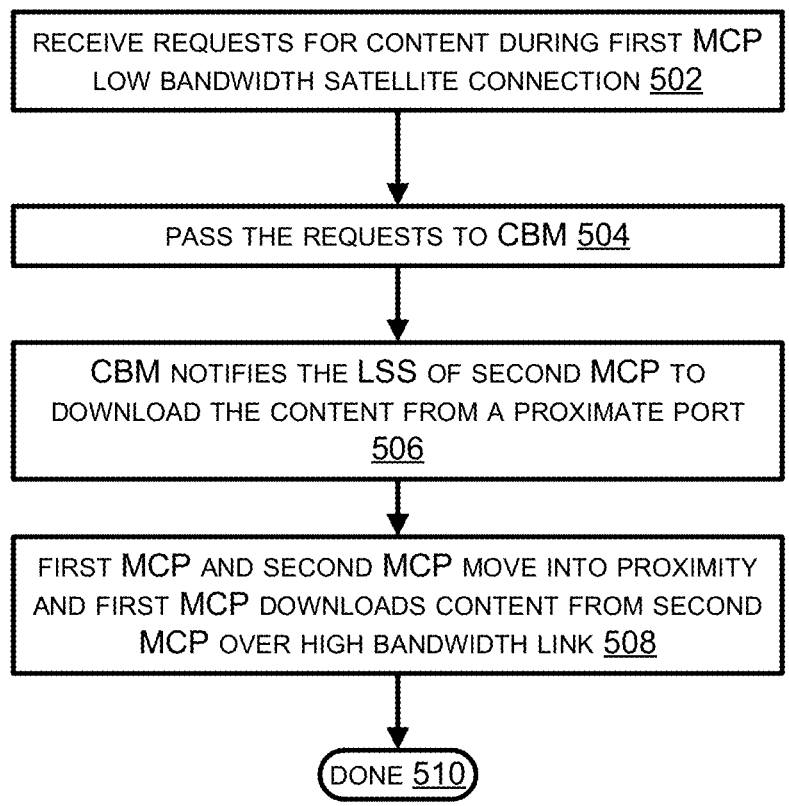

FIGS. 3-5 illustrate example processes for establishing a roaming content aggregation system. Content requests are received from an MCP having only a low-bandwidth satellite connection available (302). These requests are passed via the satellite connection to the CBM (304), which causes the content to be cached at a port or aboard a second MCP proximate to a port and having a high-bandwidth wireless connection to the port (306). The first MCP then downloads the content from the port or the second MCP at a later time of proximity with one or both (308), and concludes (310). The CBM may notify the first MCP of the location of the cached content, or the first MCP may obtain a manifest of cached content from the second MCP or port upon obtaining proximity, or the first MCP may make a request for the content to the second MCP or port upon obtaining proximity. The timing of fulfillment of a content request may also be determined. For instance, the present coordinates of the first MCP, combined with information about its predicted motion in the future, may be applied against a content aggregation zone for the MCP, and a caching policy therefore (e.g., including coordinates and predicted motion of other MCPs, and coordinates of ports in the zone). See 402. When a content request is received by the first MCP (404), the policy and zone may be applied to determine and report to the requesting party a delay before the content will be available (406). This time delay may be reported to the requestor, and a payment by the requestor may be applied to prioritize the content request so that the content is made available sooner, via transfer over the satellite connection. The process then concludes (408). In a variation, content requests are received from an MCP having only a low-bandwidth satellite connection available (502). These requests are passed via the satellite connection to the CBM (504), which notifies the LSS of a second MCP proximate to a port and having a high-bandwidth wireless connection to the port to download the content from or through the port (506). The first MCP then downloads the content from the second MCP at a later time of proximity (508), and the process concludes (510).

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A content caching system, comprising:
first and second moving vessels (MCPs);
the first and second MCPs comprising logic to communicate content requests to a satellite;
a central bandwidth manager (CBM) to receive the content requests from the satellite and to choose one or both of a port and the second MCP to cache content specified in a request from the first MCP; and
the first MCP comprising logic to download the content using a directed wireless link upon obtaining proximity with the port or the second MCP.

2. The system of claim 1, further comprising:
the CBM comprising logic to predict a time of fulfillment for the content requests based upon coordinate and predicted motion of the MCPs.

3. The system of claim 1, further comprising:
logic to receive payments from parties requesting content and to apply the payments to reduce the time of fulfillment for content requests.

4. A content caching process, comprising:
a first moving vessel (MCP) communicating a content request to a satellite;
a central bandwidth manager (CBM) receiving the content request from the satellite and selecting one or both of a port and a second MCP to cache the content specified in the request; and
the first MCP downloading the content from the second MCP or port using a directed wireless link, upon obtaining proximity with the port or second MCP.

5. The process of claim 4, further comprising:
the CBM comprising predicting a time of fulfillment for the content requests based upon coordinate and predicted motion of the first MCP.

6. The process of claim 4, further comprising:
receiving payment from parties making the content requests and applying the payments to reduce the time of fulfillment for the content requests.

7. The process of claim 4, further comprising:
the second MCP leaving a port with the requested content cached, and upon coming into range of the directed wireless link with the first MCP, the first MCP downloading the requested content from the second MCP over the directed wireless link.

8. The process of claim 7, further comprising:
a third MCP communicating a request to the satellite for the same content requested by the first MCP;
the CBM receiving the content request from the third MCP from the satellite and selecting the first MCP as an identified cache for the content specified in the request from the third MCP; and
the third MCP downloading the content from the first MCP using a directed wireless link upon obtaining proximity with the first MCP.

* * * * *